Figure 2:
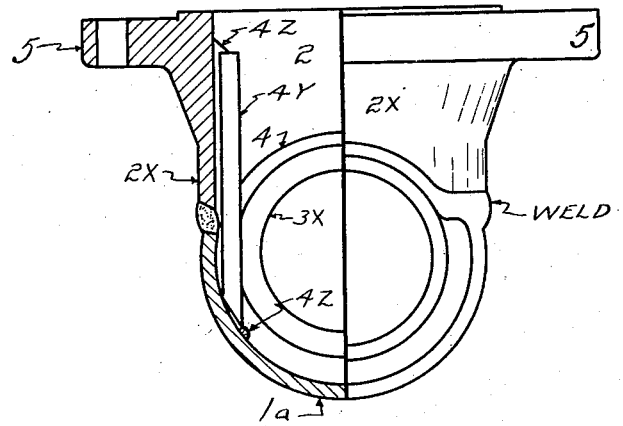

Sept. 15, 1936. L. G. PLANT 2,054,445
WROUGHT METAL VALVE STRUCTURE
Filed Jan. 3, 1933

WITNESS
W. H. Jury

INVENTOR
L. G. Plant
BY
Wilkinson Huxley Byron Knight
ATTORNEYS

Patented Sept. 15, 1936

2,054,445

UNITED STATES PATENT OFFICE 2,054,445

WROUGHT METAL VALVE STRUCTURE

Leland G. Plant, Chicago, Ill.

Application January 3, 1933, Serial No. 649,807

4 Claims. (Cl. 251—156)

This application is a continuation in part of application Serial No. 591,377, filed February 6, 1932, now Patent No. 2,034,418, issued March 17, 1936, and the invention relates to valves of the well known gate type, functioning similarly to gate valves heretofore known and used but involving novelty in the elements employed in their production as well as in their structural organization when produced.

The so-called gate valve is that type which, when open, affords a passage for fluid flow therethrough (the minimum area of this passageway being approximately that of a circle having a diameter equal to the rated size of valve) and which depends for closure upon wedging a gate between two opposed ports whose faces are inclined to each other at an angle corresponding to that defined by the opposite faces of said gate. When the gate is withdrawn therefrom, these ports present a clear opening for liquid or gaseous flow through the body of the valve in stream lines approximately parallel to the axis of the duct in which the valve is inserted. In addition to the parts above mentioned, valves of this type include a stem and mechanism, usually of the screw type, for inserting the tapered gate as a wedge between the opposed ports in the body of the valve and for withdrawing this gate to a recess in the valve body, out of the path of flow through the valve.

My present invention provides a construction for valves of the gate type which, considered as a whole in the light of its effect upon valve manufacture, is revolutionary since it not only renders practicable the use of wrought metal in the production of the larger sizes of gate valve bodies, but it serves to bring gate valve bodies constructed from wrought metal within the realm of commercial practicability by reducing the expenditure of labor and materials involved to a level comparable with, if not substantially under, the cost of cast metal valve bodies of the same size and strength.

In place of cast metal or specially forged valve bodies, my invention in valve design enables this structure to be formed entirely from a welded assembly of annular shells or other standard shapes, such, for instance, as wrought metal readily obtainable in the form of forged rings, or seamless tubing, or steel plates rolled into an annular form and welded along their abutting edges; forged flanges now commercially obtainable with necks adaptable for welding; etc. Such forgings as are required in the construction of a gate valve by my method are each relatively small in relation to the completed valve body and, being of a symmetrical annular form, present no difficulties in their forging and are easy to machine. To complete the construction of valves of the type to which my invention relates, a valve stem with packing gland, screw and yoke mechanism, hand wheel and trim common to other gate valves may be manufactured and applied.

In order that my invention may be fully understood, I will now describe a typical valve structure constituting one embodiment of the invention, reference being had to the drawing forming part of this specification.

In said drawing—

Figure 1:
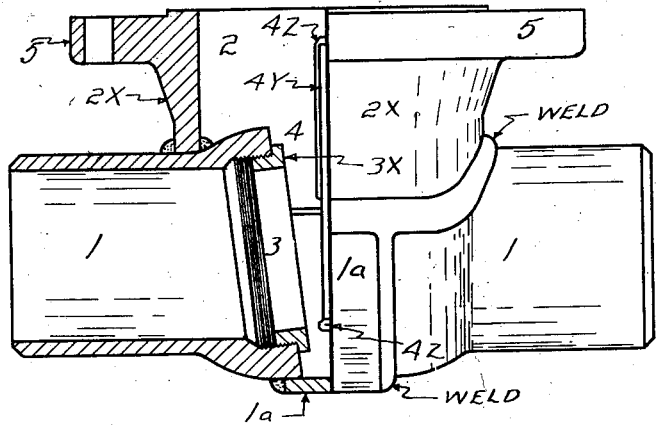

Figures 1 and 2 are, respectively, a side elevation and an end elevation, each partly in section, showing, by way of illustration, one valve structure made in accordance with the invention.

In the drawing, 1 represents port carrying cylinders of wrought metal and 1a, the segment of a wrought cylinder overlapping and welded to the port carrying cylinders, holding them in rigid axial alignment and forming therewith a through barrel with an annular wall of parallel elements structurally continuous from end to end except for an aperture bounded by the edges of said segment and circular portions of oppositely disposed ends of said port carrying cylinders. 2 represents a gate recess chamber belonging to the same valve and 2x the annular walls thereof. 3 in Figures 1 and 2, represent annular valve ports and 3x, are the faces of said ports, positioned to receive between them in sealing contact therewith, a valve gate introduced from said recess chamber through said aperture. 4 is a gateway in the walls of the barrel; and 4y are gate guides projecting from the valve body and welded thereto at points 4z. 5 is a flange formed on the walls 2x of said body construction; adapting them for the reception of a bonnet when in use. Flange 5 and the annular wall 2x, may preferably consist of an integral forging such as commercially available in various sizes under the designation of "welding neck" flanges wherein the annular wall section constitutes a neck adapted for welding the flange to a connecting pipe duct.

The valve body construction above described, and modifications to which it is susceptible without losing its characteristic features, are clearly shown in Figures 1 and 2. The entire structure, as shown in the drawing, is constructible from two sections and a segment of wrought metal tubing, and an annular ring forging, or sections thereof welded together upon their cylindrical surfaces and edges without any of these parts being forged, bent or distorted from its original cylindrical form. The resultant construction providing a valve barrel with annular walls structurally continuous from end to end except for the gateway 4 which embrace in rigid alignment the two valve port faces 3x in position to receive between them a gate in sealing contact therewith. Being constructed from cylindrical sections of wrought metal, the barrel gate recess chamber may readily be made entirely of special alloyed metals commercially available in drawn or forged cylinders.

The resulting construction affords a gate valve structure easily assembled by means of welding together wrought metal sections without recourse to castings or to forgings specially shaped to conform with the individual requirements of a valve body and, in further distinction to all prior proposals for making gate valve structures of wrought metal and assembling them by welding, the present invention embodies a barrel axially parallel to fluid flow through valve and not structurally dependent upon the gate recess wall structure for supporting oppositely disposed valve port faces in rigid alignment. This barrel has a convex wall surface of parallel elements each structurally continuous from end to end except for a gate aperture of less than semi-circumferential proportions between said port faces. In this construction, the wall surface which surrounds the entire periphery of both port faces, is joined by welding into a unitary annular structure (independent of the gate recess wall structure), the welding being applied directly between abutting portions of the annular walls surrounding said faces or preferably, as shown in the drawing, these walls are joined in an integral annular structure by the short segment of a wrought cylinder overlapping the adjacent convex wall surfaces and welded to each along edges contacting therewith. In this construction its welded contact to the wall of the gate recess chamber is confined to one semi-circumferential face on the convex surface of said through barrel and although this contact tends to reinforce the rigidity of its axial alignment, it is not requisite thereto. Furthermore, in this construction all lines of welding required to maintain the port faces in rigid relative alignment, lie within a cylindrical boundary formed by the projected wall of the annular recess chamber, in distinction to structures dependent upon welded contacts outside this area.

One object of this invention is its simplicity of manufacture afforded by use of standard shapes that have only to be cut to a desired length and contour without subsequent forging or bending. A gate valve body of this construction is the first to be assembled by welding together wrought metal parts that consist entirely of standard cylindrical, monoaxial shapes requiring no distortion from their originally curved forms to effect the desired valve body structure. Another object attained by this invention is its structural superiority as a foundation for supporting the two oppositely disposed valve port faces in rigid alignment at the exact relative angularity desired, in distinction to structures wherein the cylindrical members supporting said faces are held in alignment only by attachment to opposite sides of an annular wall structure perpendicular thereto, at the line of intersection therewith, or to collars projecting outwardly therefrom; it being practically essential in gate valve structures that the port faces be rigidly supported in fixed relative alignment. In this respect the present invention is the first construction of wrought metal parts assembled by welding, equivalent to a gate valve body of cast metal formed to support each port around its entire periphery in a through barrel with annular walls integrally continuous from end to end except for a gate aperture.

I claim:

1. In a gate valve body, two wrought metal port carrying cylinders, a segment of a wrought cylinder, and a forged flange with annular neck; said segment and cylinders being bonded by welding into an annular wall structure continuous from end to end except for an aperture bounded by curved portions of the oppositely disposed port carrying ends of said cylinders and by opposite edges of said segment; the neck of said flange being welded along its end edge to both of said port carrying cylinders and both edges of said segment, in a continuous line encircling said aperture.

2. In a gate valve body, two wrought metal port carrying cylinders, the segment of a cylindrical wrought metal wall overlapping both of said port carrying cylinders, a gate aperture bounded by oppositely disposed ends of said port carrying cylinders and by two oppositely disposed edges of said segment, and an annular gate recess wall welded along one of its ends upon both of said port carrying cylinders and to said segment upon two oppositely disposed surfaces thereof, in a continuous line encircling said aperture.

3. In a gate valve body, wrought cylindrical sections adapted to support two oppositely disposed valve port faces and the segment of a cylindrical wrought metal wall of greater outer radial dimensions than said cylindrical sections thereby forming a gate aperture bounded by one edge of each of said cylindrical sections and by two edges of said segment, to which an annular gate recess wall is welded along one of its ends to both of said cylindrical sections and to said segment upon two faces thereof.

4. In a gate valve body, two cylindrical walls of wrought metal positioned about a common axis, oppositely disposed valve port faces each supported by one of said cylindrical walls, both of said walls being bonded about a segment of their peripheries by a cylindrical segment and to a gate recess wall which is welded along one of its ends alternately to one of said cylindrical walls, and to said cylindrical segment, the recess wall weldings forming a continuous line encircling an aperture bounded by said cylindrical segment and by oppositely disposed ends of said cylindrical walls.

LELAND G. PLANT.